United States Patent
Gomes et al.

(10) Patent No.: US 8,281,242 B2
(45) Date of Patent: Oct. 2, 2012

(54) EDITABLE DATA TOOLTIPS

(75) Inventors: Luis M. Gomes, Cedar Park, TX (US); Madras S. Mohanasundaram, Austin, TX (US)

(73) Assignee: National Instruments Corporation, Austin, TX (US)

( * ) Notice: Subject to any disclaimer, the term of this patent is extended or adjusted under 35 U.S.C. 154(b) by 1872 days.

(21) Appl. No.: 10/676,634

(22) Filed: Oct. 1, 2003

(65) Prior Publication Data
US 2005/0028107 A1    Feb. 3, 2005

Related U.S. Application Data

(60) Provisional application No. 60/490,992, filed on Jul. 30, 2003.

(51) Int. Cl.
*G06F 3/048* (2006.01)
*G06F 3/01* (2006.01)

(52) U.S. Cl. ........ 715/711; 715/705; 715/708; 715/808; 715/809; 715/810

(58) Field of Classification Search ............... 715/762, 715/711, 708, 705, 709, 808–810
See application file for complete search history.

(56) References Cited

U.S. PATENT DOCUMENTS

| | | | |
|---|---|---|---|
| 5,724,272 A | 3/1998 | Mitchell et al. | |
| 5,771,388 A | 6/1998 | Mondrik et al. | |
| 6,076,952 A | 6/2000 | Gretta et al. | |
| 6,233,726 B1 | 5/2001 | Bowman et al. | |
| 6,507,351 B1 | 1/2003 | Bixler | |
| 6,546,433 B1 | 4/2003 | Matheson | |
| 6,690,390 B1 | 2/2004 | Walters et al. | |
| 6,781,609 B1 * | 8/2004 | Barker et al. ............. | 715/760 |
| 6,792,598 B2 | 9/2004 | Burch, Jr. et al. | |
| 7,069,547 B2 | 6/2006 | Glaser | |
| 7,275,235 B2 | 9/2007 | Molinari et al. | |

(Continued)

OTHER PUBLICATIONS

PerfectXML (http://www.perfectxml.com/nr/aspnetdebug.pdf) Oct. 2001 see this link for release date (http://www.amazon.com/gp/product/0735711410/ref=ase_theultimxmlso-20/103-1917660-6364606?s=books&v=glance&n=283155&tagActionCode=theultimxmlso-20).*

(Continued)

*Primary Examiner* — Nicholas Augustine
(74) *Attorney, Agent, or Firm* — Meyertons Hood Kivlin Kowert & Goetzel, P.C.; Jeffrey C. Hood; Mark S. Williams

(57) ABSTRACT

System and method for debugging a program. A graphical user interface (GUI) displays source code for the program in a first GUI element, and first user input is received to the first GUI element indicating an expression, e.g., including one or more one or more variables, constants, macros, and/or operators, in the source code. A value of the expression is displayed in a tooltip in response to the first user input. Second user input is received to the tooltip modifying the value, thereby specifying a new value, and the expression in the program is set to the new value. The program continues execution in accordance with the new value of the expression. The tooltip includes a first portion, e.g., context sensitive control, displaying the value and to receive the second user input modifying the value, and a second portion, e.g., text indicator, displaying non-editable information related to the expression.

16 Claims, 12 Drawing Sheets

U.S. PATENT DOCUMENTS

| | | | |
|---|---|---|---|
| 2002/0075309 A1* | 6/2002 | Michelman et al. | 345/764 |
| 2002/0118221 A1 | 8/2002 | Hudson et al. | |
| 2002/0186257 A1 | 12/2002 | Cadiz et al. | |
| 2004/0001106 A1* | 1/2004 | Deutscher et al. | 345/838 |
| 2004/0032429 A1 | 2/2004 | Shah et al. | |
| 2004/0221262 A1* | 11/2004 | Hampapuram et al. | 717/113 |
| 2005/0076002 A1 | 4/2005 | Williams et al. | |

OTHER PUBLICATIONS

East Tennessee State University (http://csciwww.etsu.edu/blair/Using_Debugger.htm) Aug. 10, 2002.*

Introduction to Visual C++ Debugging—(http://ei.cs.vt.edu/~cs1205/c_debug/intro.html) an overview guide to features within the environment. Copyright 1997.*

Microsoft Word 2000—See included figures, which depict a tool tip that accepts user input. Copyright 1999.*

InfoWorld News—"Gates Casts Visual Studio .Net" (http:/www.infoworld.com/articles/hn/xml/02/02/13/020213hngates2.html) showing a date of arrival. Feb. 13, 2002.*

* cited by examiner

Fig. 1E (Prior Art)

EDITABLE DATA TOOLTIPS

PRIORITY DATA

This application claims benefit of priority of U.S. provisional application Ser. No. 60/490,992, titled "Editable Data Tooltips", filed Jul. 30, 2003, whose inventors are Luis M. Gomes and Madras S. Mohanasundaram.

FIELD OF THE INVENTION

The present invention relates to the field of programming, and more particularly to editable data tooltips for debugging programs.

DESCRIPTION OF THE RELATED ART

Increasingly, computer programming is performed in the context of a graphical user interface (GUI), e.g., an interactive development environment (IDE), where a user may view, edit, execute, and debug one or more program files in respective windows displayed on a display device, such as a computer monitor. Typically, the user interacts with the environment and program files with a keyboard and/or a pointing device, e.g., a mouse, for example, entering text via the keyboard, and selecting menu options, program file text, etc., via the mouse.

In some prior art systems, means are provided for inspecting or examining variables and expressions in a program during debugging. For example, tooltips are typically small windows that display values of specified variables and expressions, where, for example, there are no window title bars, no menus, no visible boundaries demarcating the displayed expression and value within the tooltip, and where the size of the tooltip is just large enough to display the information (the expression and value). The tooltips may be invoked in different ways, including, for example, the user "hovering" over a variable or expression with the cursor/mouse (keeping the cursor over the expression or variable for a specified amount of time), and/or the selecting of a menu item or keyboard shortcut ("hotkey"). Thus, during program execution (in debugging mode), the user may invoke a tooltip on a particular variable or expression, whereupon the tooltip may display the current value of the variable or expression, allowing the user to analyze or assess the program behavior based on the displayed value.

FIGS. 1A-1D illustrate examples of prior art tooltips. FIG. 1A illustrates a tooltip invoked for display of a integer value, FIG. 1B illustrates a tooltip invoked for display of a floating point (real) value, FIG. 1C illustrates a tooltip invoked for display of a string, and FIG. 1D illustrates a tooltip invoked for display of a syntactic expression that is not in the form of a variable, but rather comprises two constants (2 and 3) and an operator (+). In each of these examples, execution of the program (e.g., in debug mode) has been halted, an expression selected or indicated, and the tooltip invoked for display of the expression value. Typically, tooltips are dismissed automatically when the cursor is moved away from the expression.

In some cases during the course of debugging, the user may wish to modify or edit the value of a variable. Generally, such modifications must be made in or invoked from a special "variable" or "watch" window, where the user must typically invoke display of the variable or watch window, locate the variable or expression, and edit the value in a special dialog box or equivalent. FIG. 1E illustrates a prior art approach to modifying a variable during a program debugging session. As FIG. 1E shows, a variables window is provided wherein values of specified variables are displayed. Each variable may be selected by a user (e.g., by double-clicking on the variable, etc.), and a pop-up window invoked that provides various GUI elements for modifying the selected variable. In the example of FIG. 1E, the pop-up window is shown labeled "Edit Value (Decimal)", indicating the data type of the selected variable. As FIG. 1E also shows, the pop-up window displays the name of the variable ("g") and provides a field for displaying the current value of the variable, and for specifying a new value of the variable. In this example, the current value of −147.87 is being replaced with new value 500.23, as shown. Buttons are also provided for confirming the modification ("OK") and for canceling the edit. Thus, the approach illustrated in FIG. 1E involves numerous GUI elements, selections, and invocations to specify and edit the value of the expression. This process may be convoluted and time-consuming, and, in a complex debugging process where many variables are examined and modified, tedious.

Thus, improved systems and methods for debugging programs are desired.

SUMMARY OF THE INVENTION

One embodiment of the present invention comprises a system and method for debugging a program using editable data tooltips, e.g., via the invocation and use of an editable tooltip to display and edit a value of an expression or variable during program debugging. In a preferred embodiment, the program is debugged in a graphical environment, e.g., with a graphical user interface (GUI), whereby the user may run and interact with the program being debugged, as is well known in the art.

Source code for the program may be displayed in a first GUI element, e.g., in a window of the GUI. For example, in one embodiment, C language source code for at least a portion of the program may be displayed in the first GUI element.

First user input may be received to the first GUI element indicating an expression in the source code, and may include any of various means for indicating the expression. In one embodiment, the first user input may be received from a pointing device, e.g., a mouse, trackball, eye-tracker, etc. For example, the first user input may include the user "hovering" the cursor over the expression. In another embodiment, the user may double-click on the expression with the pointing device or dragging the cursor over the expression with a mouse key (or shift key) depressed, thereby selecting the expression. In yet another embodiment, the first user input may be received from a keyboard, i.e., the user may use the keyboard to select or indicate the expression, e.g., by moving the cursor to the expression via arrow keys and dragging the cursor over the expression with the arrow keys while holding down a shift key, and so forth. In yet another embodiment, the first user input may be received to a menu, e.g., presented by the GUI. Combinations and variants of these user input means are also contemplated, as well as any other means of selecting or indicating the expression.

In response to the first user input, a value of the expression may be displayed in a tooltip. In a preferred embodiment, the expression comprises a syntactic expression, which may include one or more variables, one or more constants, one or more macros, and/or one or more operators. In one embodiment, the method may include evaluating the expression to determine the value of the expression. For example, in the case that the expression is a variable, evaluating the expression may simply mean reading the value from a memory location of the variable. In the case of an expression involving constants and/or variables and one or more operators, evaluating the expression may entail computing a result of the expression, e.g., performing the indicated operation(s) with the constants and/or variables to generate the result. The result may then be displayed as the value of the expression.

In one embodiment, the tooltip may be context sensitive, i.e., the tooltip may be operable to present a control corresponding to a data type of the expression, where the data type of the expression may include at least one of: a string data type, a character data type, a numeric data type, a Boolean data type, and an array data type, among others. Thus, the tooltip may automatically include a control of the correct type for displaying (and modifying) the value of the expression.

In one embodiment, the tooltip may be operable to display the value of the expression in a specified format. For example, if the expression includes integer data, the specified format may include decimal, hexadecimal, octal, binary, and/or ASCII, formats. Similarly, if the expression includes single or double precision, the specified format may include floating point, and/or scientific notation. The format may be specified in any of a variety of ways. For example, in one embodiment, the user may specify the format, e.g., by right-clicking on the expression and selecting the format from a pop-up menu or dialog. In a preferred embodiment, the specified format may be specified via a second GUI element in the GUI, e.g., a variables or watch window, described in more detail below. In some embodiments, the tooltip may include or utilize default formats for basic data types. In other embodiments, a substitute format may be used for in the case that a particular format is not supported. For example, if the user selects an ASCII format, and ASCII is not supported, the data may be displayed in decimal format in the tooltip.

Second user input may then be received to the tooltip modifying the displayed value, thereby specifying a new value for the expression. For example, the user may place the cursor in the editable portion of the tooltip and enter the new value for the expression.

Finally, the expression in the program may be set to the new value, where the program may then continue execution in accordance with the new value of the expression. For example, the user may select a menu option or press a button or icon in the GUI indicating that execution of the program is to resume, in response to which the program may continue to execute, but with the new value of the expression in effect (as opposed to the original value).

In one embodiment, after the user has changed the value in the tooltip, the method may read the new value, and change the variable or expression in the program by finding and over-writing the memory location associated with the data. The method (e.g., a debugger implementing an embodiment of the present invention) may be able to overwrite the memory location in the program being debugged using debug information associated with the program, e.g., using debugging privileges that allow writes into the program's memory space without the operating system raising an access violation exception.

In one embodiment, the method may also include dismissing the tooltip, based for example on third user input indicating dismissal of the tooltip, and/or on a lapse of a specified time period. For example, in one embodiment, the third user input may include the user moving the cursor away from the tooltip, e.g., using a pointing device, in response to which the tooltip may be dismissed. As noted above, in a preferred embodiment, the method may allow or even require the user to move the mouse to click on the editable portion of the tooltip to edit the value, and so to avoid premature dismissal of the tooltip, in one embodiment, the mouse movement after the tooltip is displayed may be tracked and a determination made as to whether the user is moving towards the editable region of the tooltip, and if so, the tooltip may not be dismissed. In one embodiment, a heuristic may be used to determine whether the user is moving the cursor away from the tooltip, and if the heuristic indicates that the user is moving the cursor away from the editable region, the tooltip may be dismissed. In one embodiment, the heuristic may include determining whether the mouse position is within the tooltip window or a triangular region between the previous mouse position and the nearest edge or edges of the tooltip window.

In another embodiment, the third user input may include the user clicking (with the mouse) on a "go away" button or icon, or alternatively, right-clicking on the tooltip to invoke a menu and selecting a "done" option or equivalent. In other words, the tooltip for the expression may be revoked or removed based on user input indicating that the edit of the expression value is done and/or based on an elapsed time period.

In various embodiments, the expression may be set to the new value upon resumption of program execution, upon dismissal of the tooltip, upon an indication from the user to do so, or when the new value is entered by the user.

In a preferred embodiment, the tooltip may display the expression and the value. For example, in one embodiment, the tooltip may include a first portion, operable to display the value of the expression, where the first portion is further operable to receive the second user input modifying the value, and a second portion, operable to display non-editable information related to the expression, e.g., the expression itself, such as a variable name, for example, via a text indicator operable to display text indicating the expression, e.g., the variable name or terms of the expression. Thus, the tooltip may display a text string indicating the expression, e.g., the name of a variable or a more complex expression, such as "2+3", and a control displaying the value of the variable, where the control may be operable to receive user input modifying the value, e.g., the second user input mentioned above. In one embodiment, the first portion may be further operable to graphically indicate that the value is editable. For example, the editable information, i.e., the value, may be displayed in a different font or type, or otherwise graphically distinguished from the non-editable information, e.g., in bold, italic, etc.

In some embodiments, the data tooltip may also display program data that cannot be edited in a meaningful sense, including, for example, constant expressions like 2+3, memory addresses, etc., where the editability of the data may be determined by analyzing debug information associated with the data. In addition, there may be cases where there is not enough space to display the data because the tooltip required to present the data does not fit within the space available inside the source code window. In one embodiment, if this situation occurs, the data may be truncated and ellipses added to the display so as to fit the tooltip inside the source code window. In this case, the tooltip data may be considered non-editable even if the underlying program data is editable. Based on the editability of the data being displayed, the tooltip may thus be created with an indicator (in a non-editable mode) or with a control (in an interactive mode) for displaying the expression value.

For example, in one embodiment, if the tooltip is invoked by a mouse hover condition, the user may start editing the data in the tooltip by clicking on the editable (bold) part of the tooltip. As soon as the user clicks on the editable portion of the tooltip, the control may be made active and the user may interact with the control and modify the data as with a normal string or numeric control. If the user invokes the tooltip using a menu item or keyboard shortcut, the tooltip may be displayed with the control already active, and so the user may immediately interact with the control and edit the data. In these cases, the user may not have to click on the editable portion of the tooltip to begin editing the data.

Thus, in one embodiment, the tooltip may facilitate viewing and editing numeric data in various formats like decimal, hexadecimal, octal, binary, and ASCII for integer data and floating point or scientific notation format for single and double precision data, and may facilitate viewing and editing text data in a string format. As noted above, one embodiment, the user may choose the format based on the user's preference and/or the context of the data. In one embodiment, the user may be able to choose different formats for different variables in the same program, i.e., the format preferences may be set globally and then overwritten for individual variables and expressions. In one embodiment, the method may use data formatting preferences set in the variable/watch windows when displaying numeric data to be edited in the tooltips.

Thus, in one embodiment, to make the data tooltip editable, a string or numeric control may be included in the tooltip, and the controls made interactive when the user starts editing the displayed value, where the string control is used when the data being edited is a string, and the numeric control is used when the data being edited is a number (floating point or integer data). A text indicator is preferably included to display the non-editable portion of the tooltip (variable name, address, expression terms, etc.). Note that before the user starts editing the data, the new controls preferably cannot be distinguished from the rest of the tooltip contents. In other words, the string and numeric controls may be customized to be substantially transparent to the user.

Thus, various embodiments of editable tooltips may be provided for viewing and editing program data during the course of program debugging.

BRIEF DESCRIPTION OF THE DRAWINGS

A better understanding of the present invention can be obtained when the following detailed description of the preferred embodiment is considered in conjunction with the following drawings, in which:

FIG. 1E illustrates a pop-up window for editing program data, according to the prior art;

Figure 1A:
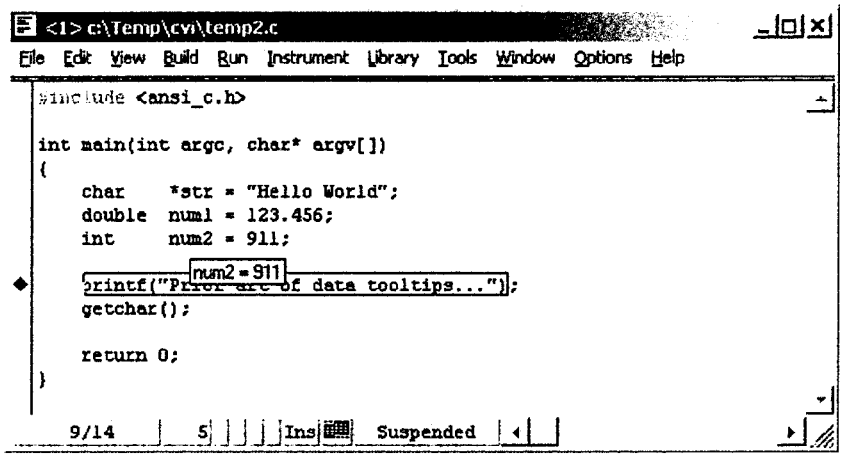
FIGS. 1A-1D illustrate embodiments of tooltips, according to the prior art.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. provisional application Ser. No. 60/490,992, titled "Editable Data Tooltips", filed Jul. 30, 2003.

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000.

TERMS

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element;

encompasses various types of mediums that can either store program instructions/data structures or can be configured with a hardware configuration program.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc. Nodes may be connected together in a graphical program by connection icons or wires.

Data Flow Graphical Program (or Data Flow Diagram)— A graphical program or diagram comprising a plurality of interconnected nodes, wherein the connections between the nodes indicate that data produced by one node is used by another node.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Tooltip—a window that displays values of expressions, e.g., variables, and possibly the expressions (or information related to the expressions), where there are no window title bars, no menus, no visible boundaries demarcating the displayed value and expression (or information related to the expression) within the tooltip, and where the size of the tooltip is substantially just large enough to display the information, i.e., the value and/or the expression (or information related to the expression).

Figure 2A:
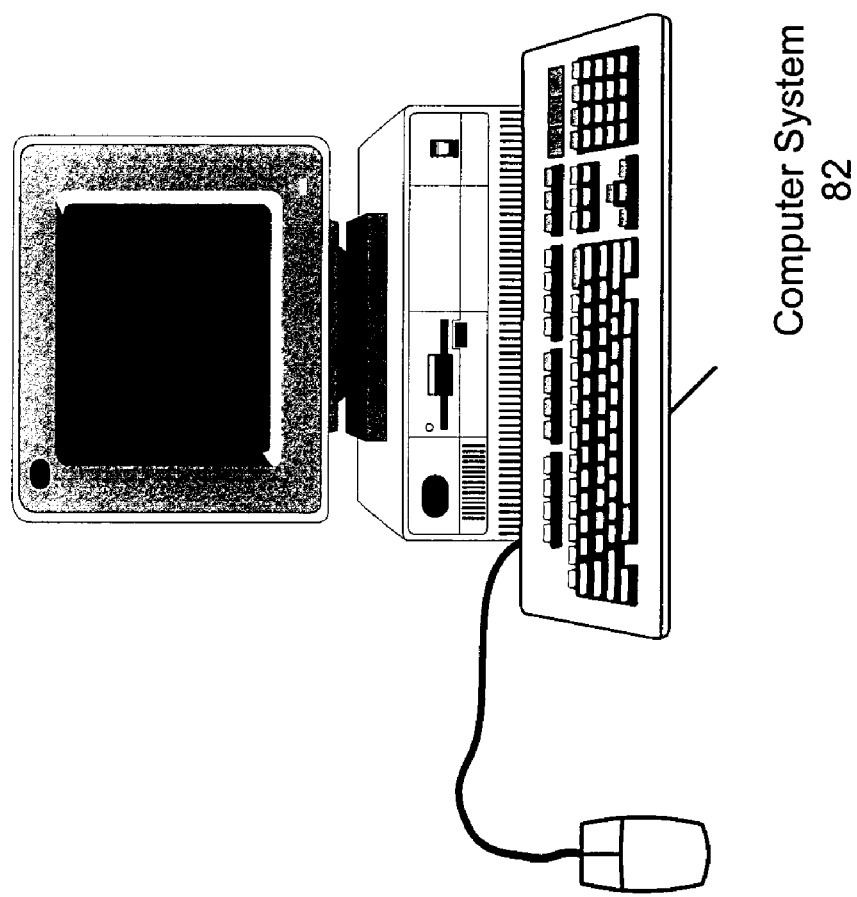
FIG. 2A illustrates a computer system operable to implement various embodiments of the present invention.

FIG. 2A—Computer System

FIG. 2A illustrates a computer system 82 suitable for implementing various embodiments of the present invention. One embodiment of a method for debugging a program using editable tooltips is described below.

As shown in FIG. 2A, the computer system 82 may include a display device operable to display the program and/or program results as the program is created and/or executed. The display device may also be operable to display a graphical user for debugging the program during execution of the program, e.g., in debug mode. The graphical user interface may comprise any type of graphical user interface, e.g., depending on the computing platform.

The computer system 82 may include a memory medium(s) on which one or more computer programs or software components according to one embodiment of the present invention may be stored. For example, the memory medium may store one or more programs which are executable to perform the methods described herein. Also, the memory medium may store a programming development environment application used to create and/or execute such programs. The memory medium may also store operating system software, as well as other software for operation of the computer system. Various embodiments further include receiving or storing instructions and/or data implemented in accordance with the foregoing description upon a carrier medium.

Figure 2B:
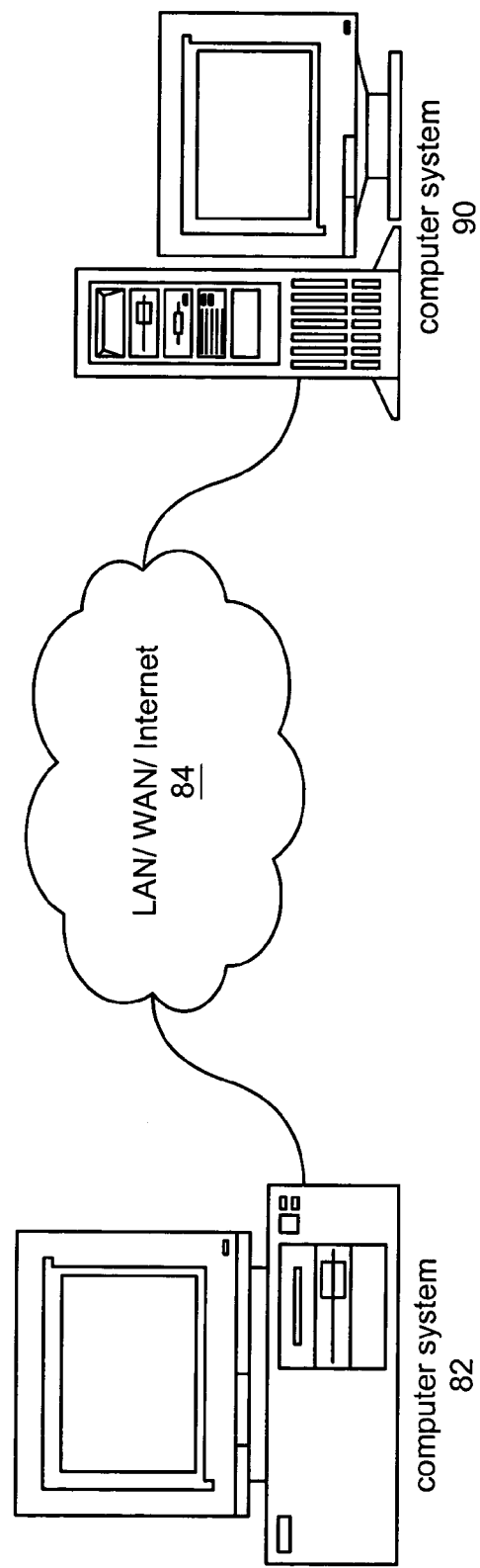
FIG. 2B illustrates a network system comprising two or more computer systems that may implement an embodiment of the present invention.

FIG. 2B—Computer Network

FIG. 2B illustrates a system including a first computer system 82 that is coupled to a second computer system 90. The computer system 82 may be connected through a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a program in a distributed fashion. For example, computer 82 may execute a first portion of the program and computer system 90 may execute a second portion of the program. As another example, computer 82 may display the graphical user interface of a program and computer system 90 may execute the program.

In one embodiment, the graphical user interface of the program may be displayed on a display device of the computer system 82, and the program may execute on a device 190 connected to the computer system 82. The device 190 may include a programmable hardware element and/or may include a processor and memory medium which may execute a real time operating system. In one embodiment, the program may be downloaded and executed on the device 190. For example, an application development environment with which the program is associated may provide support for downloading a program for execution on the device in a real time system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 3A:
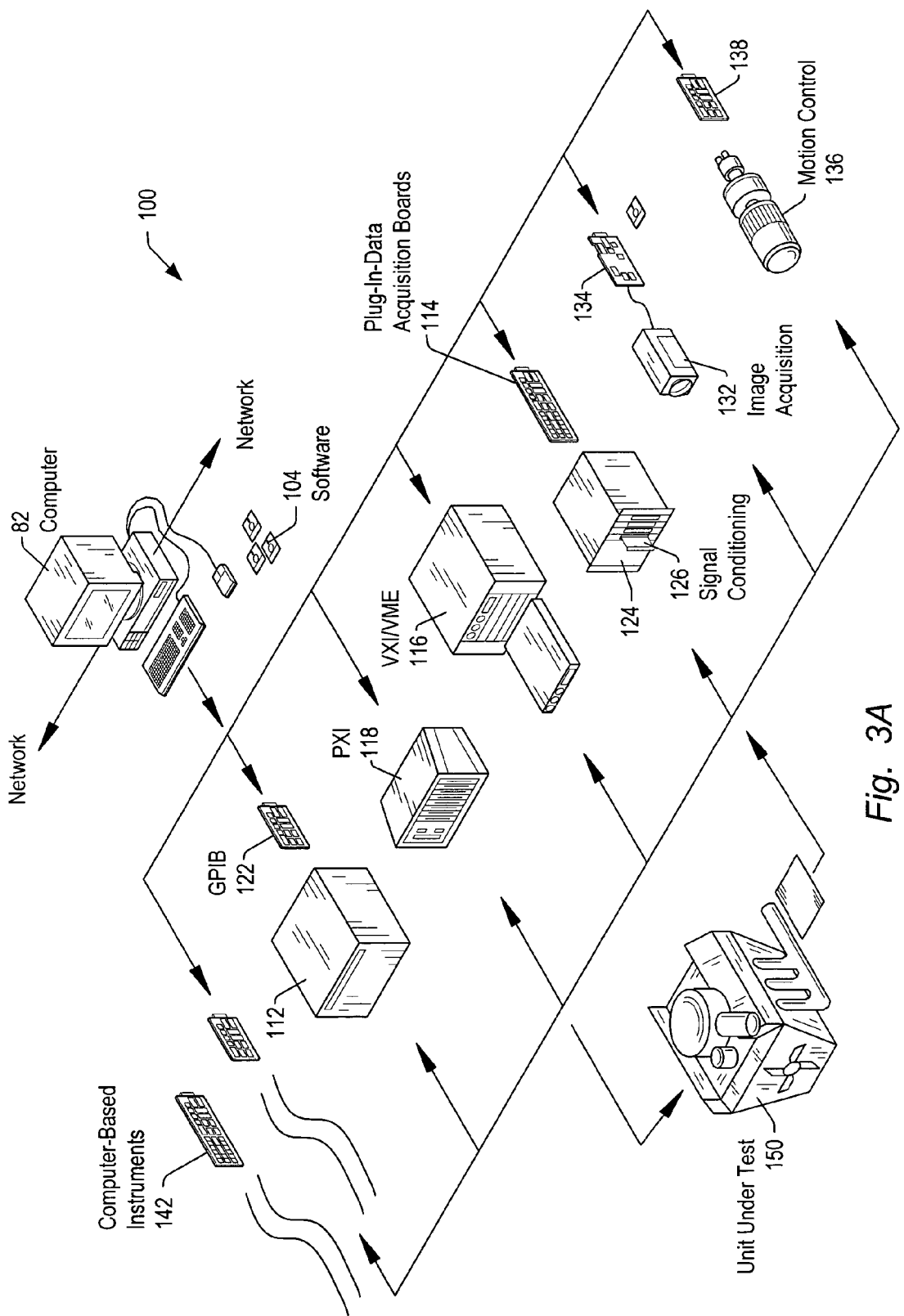
FIGS. 3A and 3B illustrate instrumentation control and industrial automation systems, according to one embodiment of the invention.

FIG. 3A illustrates an exemplary instrumentation control system 100 which may implement embodiments of the invention. The system 100 comprises a host computer 82 which connects to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 3B:
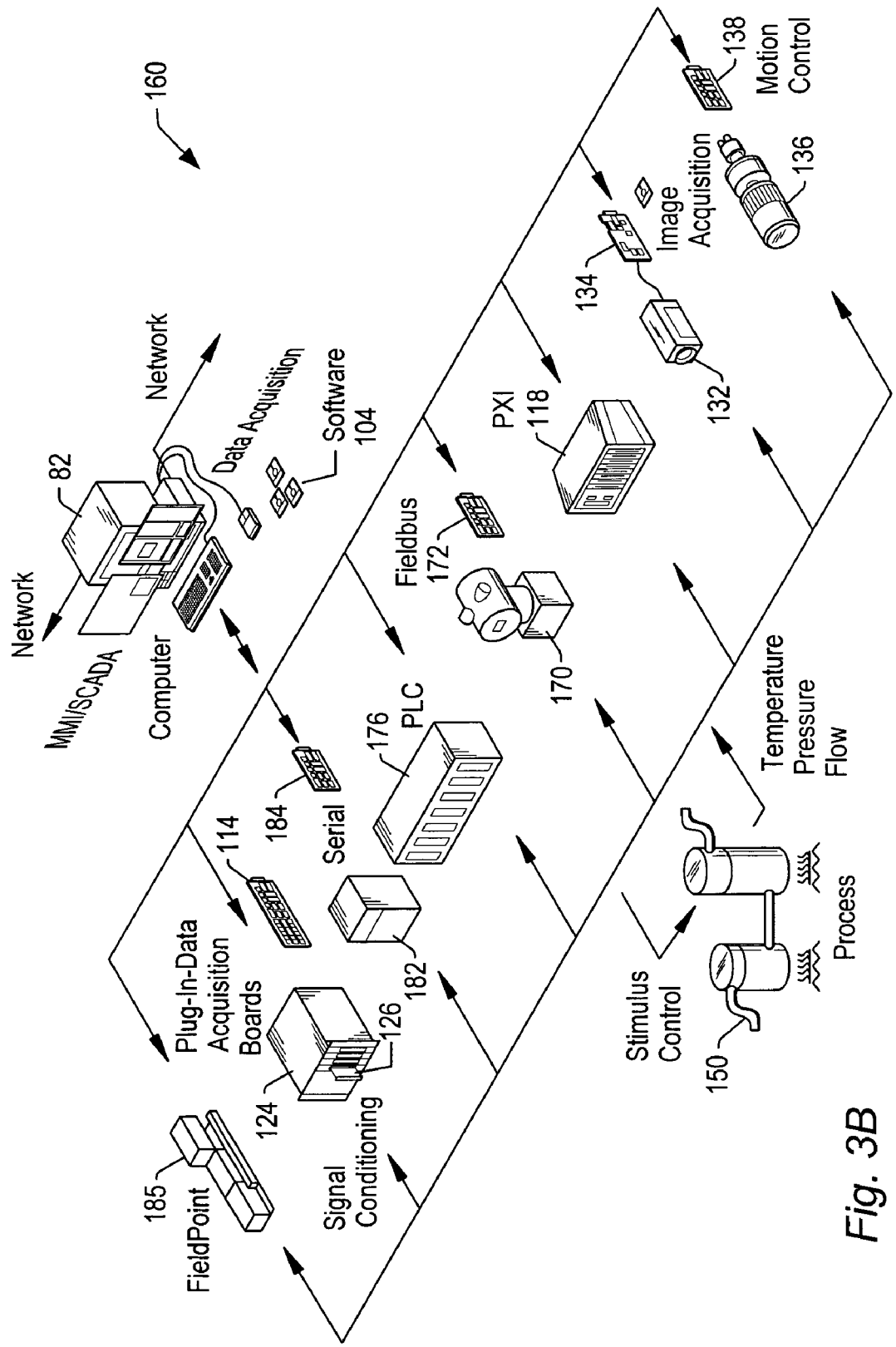

FIG. 3B illustrates an exemplary industrial automation system 160 which may implement embodiments of the invention. The industrial automation system 160 is similar to the instrumentation or test and measurement system 100 shown in FIG. 3A. Elements which are similar or identical to elements in FIG. 3A have the same reference numerals for convenience. The system 160 may comprise a computer 82 which connects to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

Figure 4:
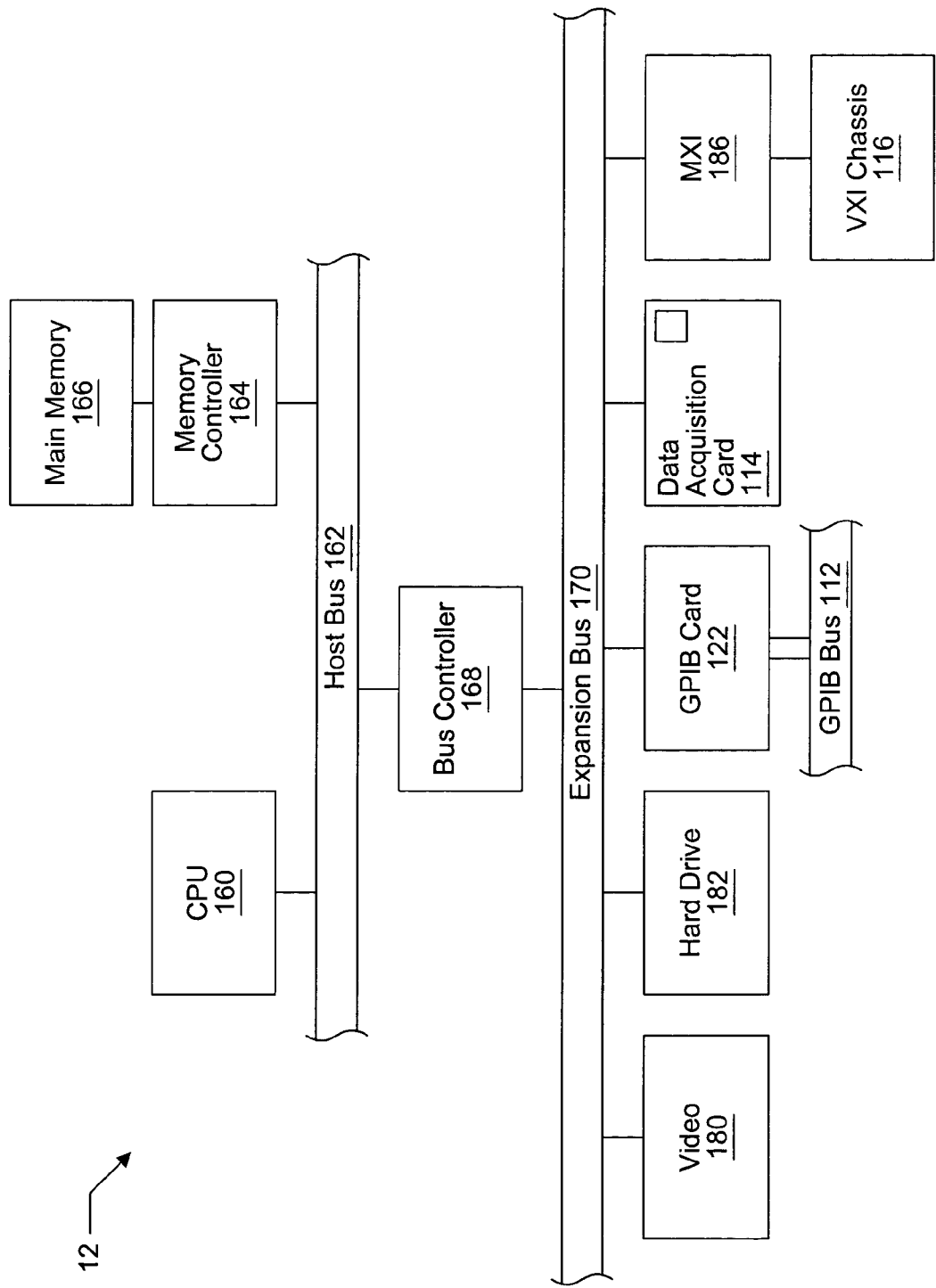
FIG. 4 is an exemplary block diagram of the computer systems of FIGS. 2A, 2B, 3A and 3B.

FIG. 4—Computer System Block Diagram

Figure 1B:
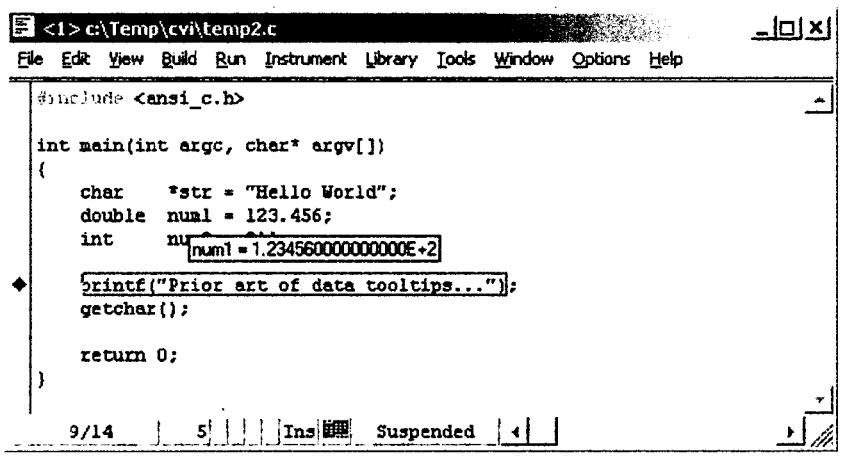
Figure 1C:
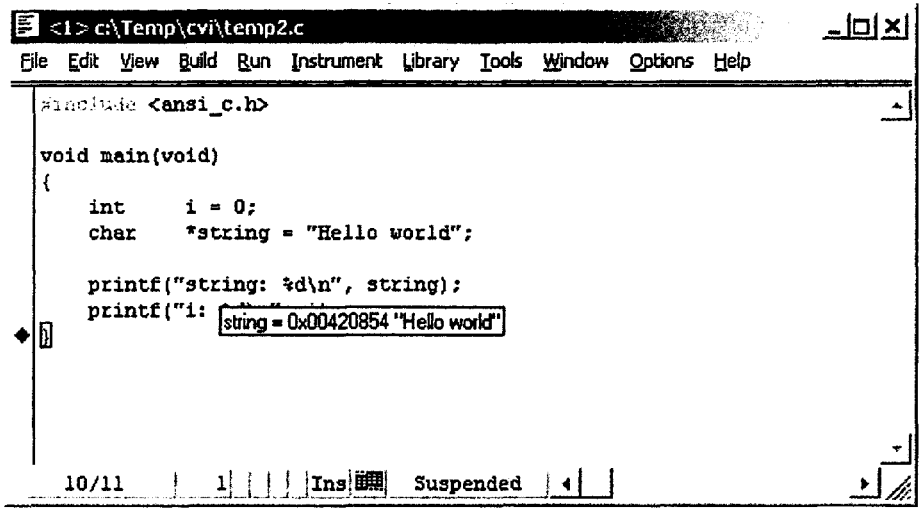
Figure 1D:
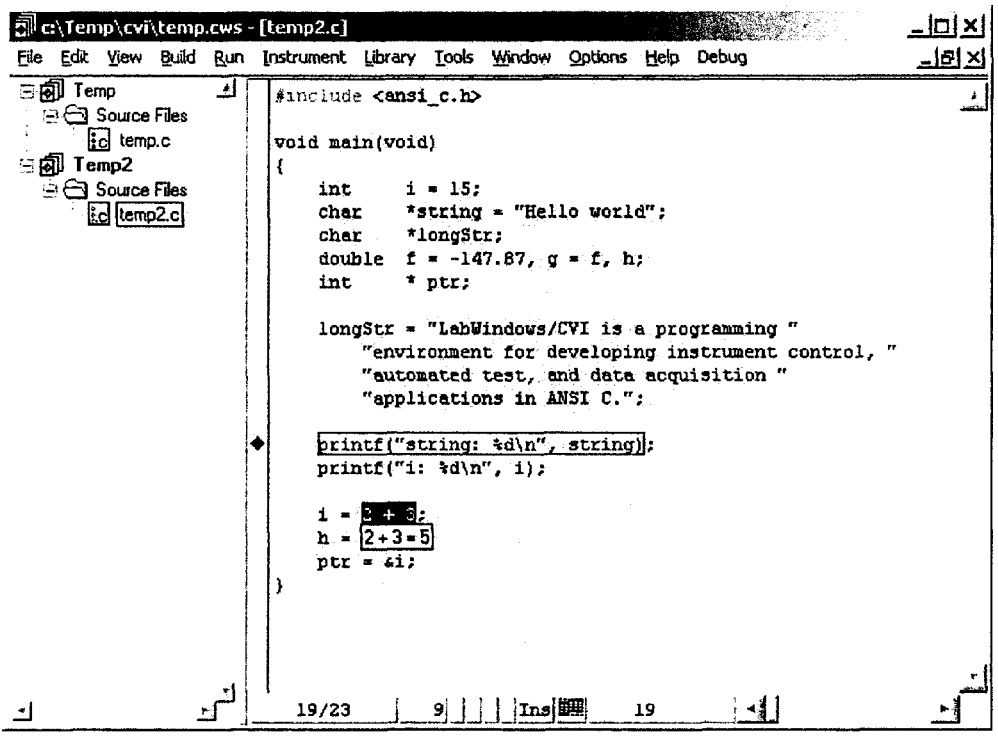
Figure 1E:
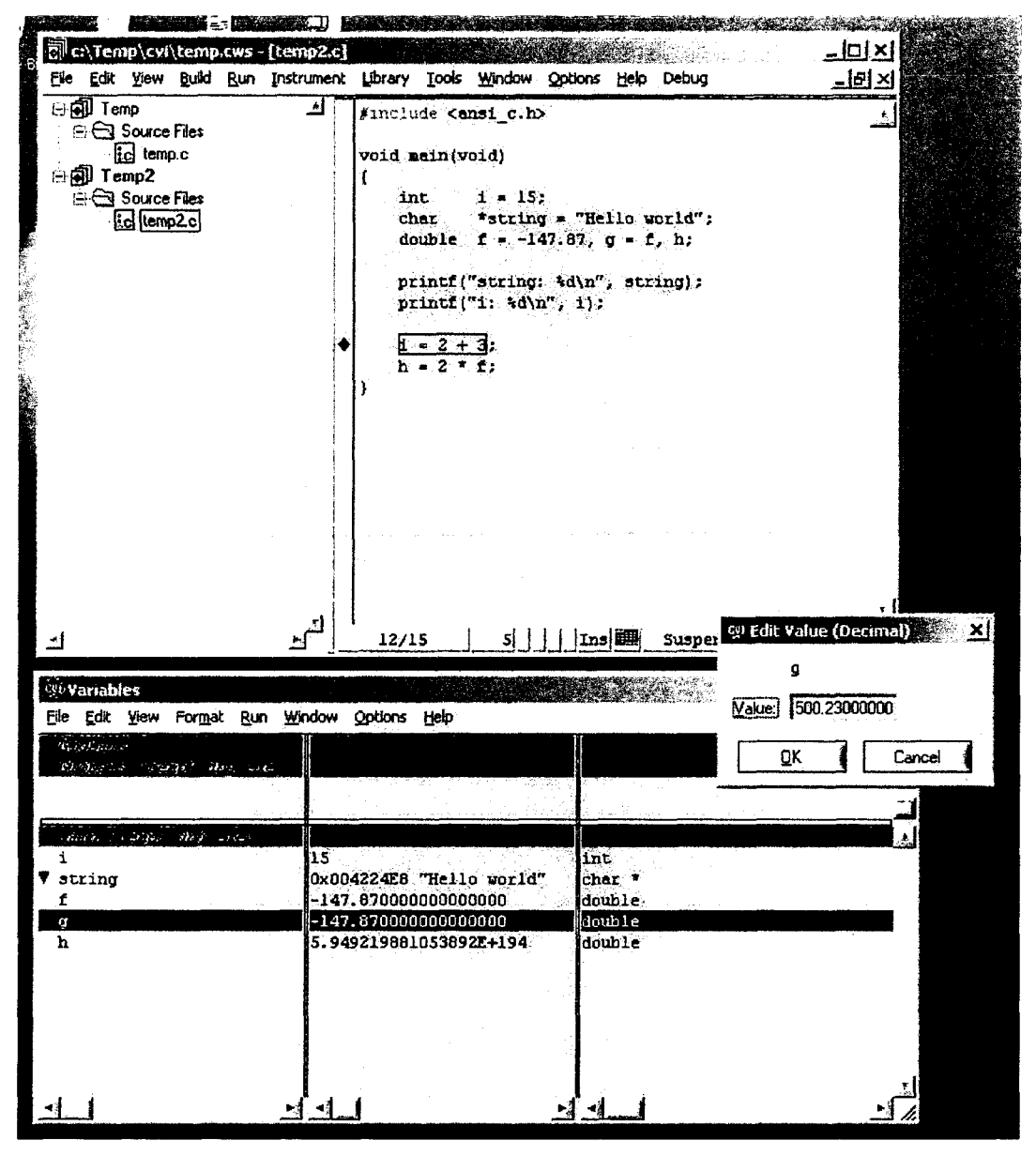

FIG. 4 is a block diagram representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store program code and data implementing various embodiments of the present invention. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170.

As shown, a device 190 may also be connected to the computer. The device 190 may include a processor and memory which may execute a real time operating system. The device 190 may also or instead comprise a programmable hardware element. The computer system may be operable to deploy a program to the device 190 for execution of the program on the device 190. The deployed program may take the form of program instructions or data structures that directly represent the program. In some embodiments the program may be a graphical program, where the deployed graphical program may take the form of text code (e.g., C code) generated from the graphical program. As another example, the deployed program may take the form of compiled code generated from either the graphical program or from text code that in turn was generated from the graphical program.

Figure 5:
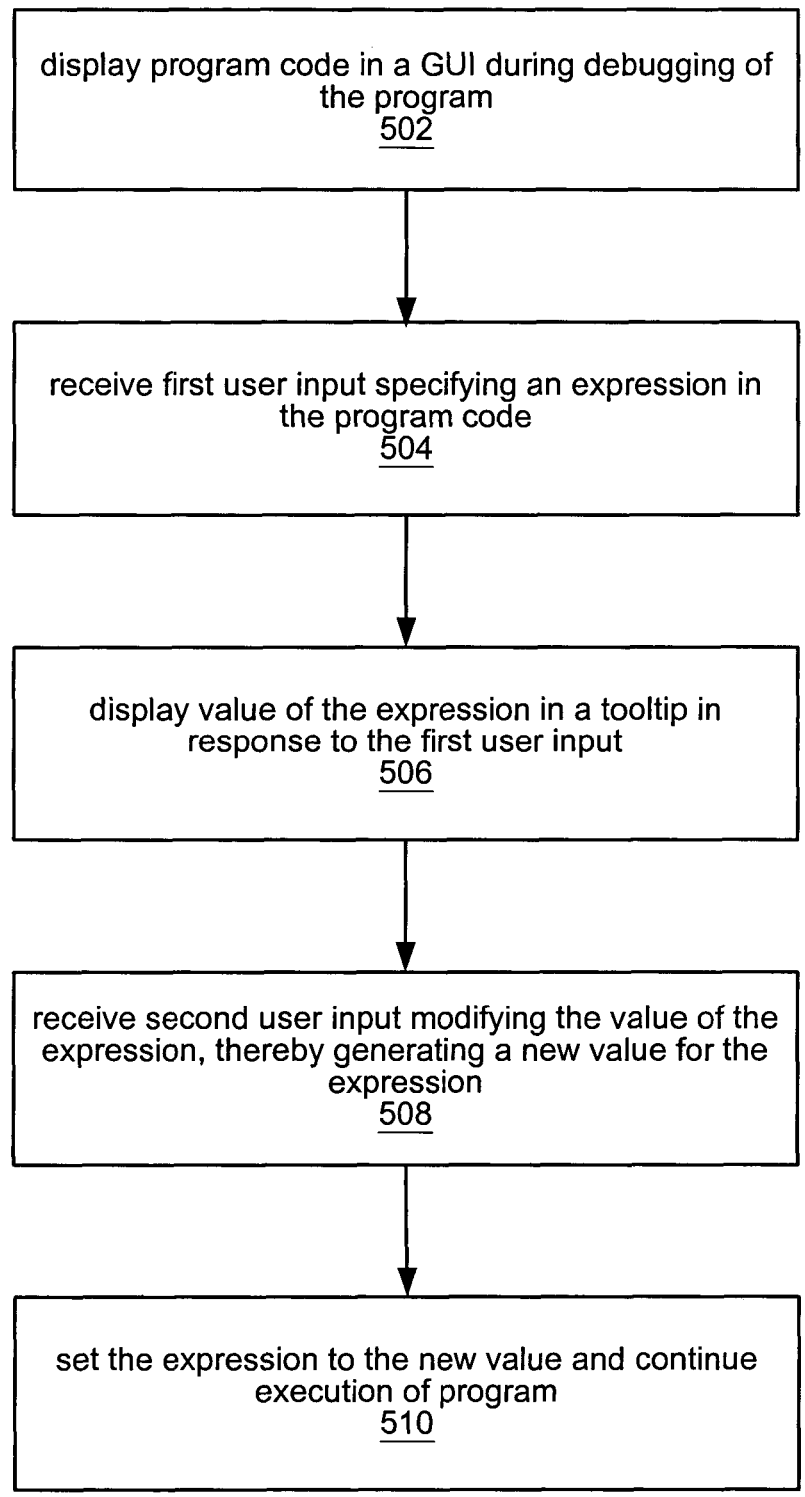
FIG. 5 is a flowchart diagram illustrating one embodiment of a method for debugging a program.

FIG. 5—Flowchart of a Method for Debugging a Program

FIG. 5 is a flowchart diagram of one embodiment of a method for debugging a program. More specifically, FIG. 5 flowcharts the invocation and use of an editable tooltip to display and edit a value of an expression or variable during program debugging. It should be noted that in various embodiments, some of the steps shown may be performed concurrently, in a different order than shown, or omitted. Additional steps may also be performed as desired.

In a preferred embodiment, the program is debugged in a graphical environment, e.g., with a graphical user interface (GUI), whereby the user may run and interact with the program being debugged, as is well known in the art.

As FIG. 5 shows, in 502, source code for the program may be displayed in a first GUI element, e.g., in a window of the GUI. For example, in one embodiment, C language source code for at least a portion of the program may be displayed in the first GUI element.

In 504, first user input may be received to the first GUI element indicating an expression in the source code. The first user input may include any of various means for indicating the expression. In one embodiment, the first user input may be received from a pointing device, e.g., a mouse, trackball, eye-tracker, etc. For example, the first user input may include the user "hovering" the cursor over the expression. In another embodiment, the user may double-click on the expression with the pointing device or dragging the cursor over the expression with a mouse key (or shift key) depressed, thereby selecting the expression. In yet another embodiment, the first user input may be received from a keyboard, i.e., the user may use the keyboard to select or indicate the expression, e.g., by moving the cursor to the expression via arrow keys and dragging the cursor over the expression with the arrow keys while holding down a shift key, and so forth. In yet another embodiment, the first user input may be received to a menu, e.g., presented by the GUI. Combinations and variants of these user input means are also contemplated, as well as any other means of selecting or indicating the expression.

In 506, in response to the first user input, a value of the expression may be displayed in a tooltip. In a preferred embodiment, the expression comprises a syntactic expression, which may include one or more variables, one or more constants, one or more macros, and/or one or more operators.

As noted above, a tooltip is a window (preferably small) that displays a value of a specified expression (e.g., a variable, string, etc.), and optionally the expression (or information related to the expression) as well, where there are no window title bars or menus, and where the size of the tooltip is substantially just large enough to display the value, or, in the case that the expression (or information related to the expression) is also displayed, to display the value and the expression (or information related to the expression). As also noted above, where both the value and the expression (or information) are displayed in the tooltip, there are no visible boundaries demarcating the displayed expression (or information) and value within the tooltip.

Note that the phrase "substantially just large enough to display the value" refers to a size just slightly larger than the displayed value. Similarly, the phrase "substantially just large enough to display the expression (or information) and value" refers to a size just slightly larger than the displayed expression (or information) and value. In one embodiment, "just slightly larger" may mean no more than approximately 5-10% larger. In another embodiment, "just slightly larger" may mean no more than approximately 10-20% larger. In yet another embodiment, "just slightly larger" may mean no more than approximately 20-30% larger, although these values are primarily intended as guidelines, and not rigid rules for tooltips.

In one embodiment, the method may include evaluating the expression to determine the value of the expression. For example, in the case that the expression is a variable, evaluating the expression may simply mean reading the value from a memory location of the variable. In the case of an expression involving constants and/or variables and one or more operators, evaluating the expression may entail computing a result of the expression, e.g., performing the indicated operation(s) with the constants and/or variables to generate the result. The result may then be displayed as the value of the expression.

In one embodiment, the tooltip may be context sensitive. In other words, the tooltip may be operable to present a control corresponding to a data type of the expression, where the data type of the expression may include at least one of: a string data type, a character data type, a numeric data type, a Boolean data type, and an array data type, among others. Thus, the tooltip may automatically include a control of the correct type for displaying (and modifying) the value of the expression.

In one embodiment, the tooltip may be operable to display the value of the expression in a specified format. For example, if the expression includes integer data, the specified format may include decimal, hexadecimal, octal, binary, and/or ASCII, formats. Similarly, if the expression includes single or double precision, the specified format may include floating point, and/or scientific notation. The format may be specified in any of a variety of ways. For example, in one embodiment, the user may specify the format, e.g., by right-clicking on the expression and selecting the format from a pop-up menu or dialog. In a preferred embodiment, the specified format may be specified via a second GUI element in the GUI, e.g., a variables or watch window, described in more detail below with reference to FIGS. 6A-6C. In some embodiments, the tooltip may include or utilize default formats for basic data types. In other embodiments, a substitute format may be used for in the case that a particular format is not supported. For example, if the user selects an ASCII format, and ASCII is not supported, the data may be displayed in decimal format in the tooltip.

In 508, second user input may be received to the tooltip modifying the displayed value, thereby specifying a new value for the expression. For example, the user may place the cursor in the editable portion of the tooltip and enter the new value for the expression.

Finally, in 510, the expression in the program may be set to the new value, where the program may then continue execution in accordance with the new value of the expression. For example, the user may select a menu option or press a button or icon in the GUI indicating that execution of the program is to resume, in response to which the program may continue to execute, but with the new value of the expression in effect (as opposed to the original value).

In one embodiment, after the user has changed the value in the tooltip, the method may read the new value, and change the variable or expression in the program by finding and over-writing the memory location associated with the data. The method (e.g., a debugger implementing an embodiment of the present invention) may be able to overwrite the memory location in the program being debugged using debug information associated with the program, e.g., using debugging privileges that allow writes into the program's memory space without the operating system raising an access violation exception.

In one embodiment, the method may also include dismissing the tooltip, based for example on third user input indicating dismissal of the tooltip, and/or on a lapse of a specified time period. For example, in one embodiment, the third user input may include the user moving the cursor away from the tooltip, e.g., using a pointing device, in response to which the tooltip may be dismissed. As noted above, in a preferred embodiment, the method may allow or even require the user to move the mouse to click on the editable portion of the tooltip to edit the value, and so to avoid premature dismissal of the tooltip, in one embodiment, the mouse movement after the tooltip is displayed may be tracked and a determination made as to whether the user is moving towards the editable region of the tooltip, and if so, the tooltip may not be dismissed. In one embodiment, a heuristic may be used to determine whether the user is moving the cursor away from the tooltip, and if the heuristic indicates that the user is moving the cursor away from the editable region, the tooltip may be dismissed. In one embodiment, the heuristic may include determining whether the mouse position is within the tooltip window or a triangular region between the previous mouse position and the nearest edge or edges of the tooltip window.

In another embodiment, the third user input may include the user clicking (with the mouse) on a "go away" button or icon, or alternatively, right-clicking on the tooltip to invoke a menu and selecting a "done" option or equivalent. In other words, the tooltip for the expression may be revoked or removed based on user input indicating that the edit of the expression value is done and/or based on an elapsed time period.

In various embodiments, the expression may be set to the new value upon resumption of program execution, upon dismissal of the tooltip, upon an indication from the user to do so, or when the new value is entered by the user.

In a preferred embodiment, the tooltip may display the expression and the value. For example, in one embodiment, the tooltip may include a first portion, operable to display the value of the expression (506 above), where the first portion is further operable to receive the second user input modifying the value (508 above), and a second portion, operable to display non-editable information related to the expression, e.g., the expression itself, such as a variable name, for example, via a text indicator operable to display text indicating the expression, e.g., the variable name or terms of the expression. Thus, the tooltip may display a text string indicating the expression, e.g., the name of a variable or a more complex expression, such as "2+3", and a control displaying the value of the variable, where the control may be operable to receive user input modifying the value, e.g., the second user input mentioned above. In one embodiment, the first portion may be further operable to graphically indicate that the value is editable. For example, the editable information, i.e., the value, may be displayed in a different font or type, or otherwise graphically distinguished from the non-editable information, examples of which are provided below.

In some embodiments, the data tooltip may also display program data that cannot be edited in a meaningful sense, including, for example, constant expressions like 2+3, memory addresses, etc., where the editability of the data may be determined by analyzing debug information associated with the data. In addition, there may be cases where there is not enough space to display the data because the tooltip required to present the data does not fit within the space available inside the source code window. In one embodiment, if this situation occurs, the data may be truncated and ellipses added to the display so as to fit the tooltip inside the source code window. In this case, the tooltip data may be considered non-editable even if the underlying program data is editable. Based on the editability of the data being displayed, the tooltip may thus be created with an indicator (in a non-editable mode) or with a control (in an interactive mode) for displaying the expression value.

For example, in one embodiment, if the tooltip is invoked by a mouse hover condition, the user may start editing the data in the tooltip by clicking on the editable (bold) part of the tooltip. As soon as the user clicks on the editable portion of the tooltip, the control may be made active and the user may interact with the control and modify the data as with a normal string or numeric control. If the user invokes the tooltip using a menu item or keyboard shortcut, the tooltip may be displayed with the control already active, and so the user may immediately interact with the control and edit the data. In these cases, the user may not have to click on the editable portion of the tooltip to begin editing the data.

Figure 6A:
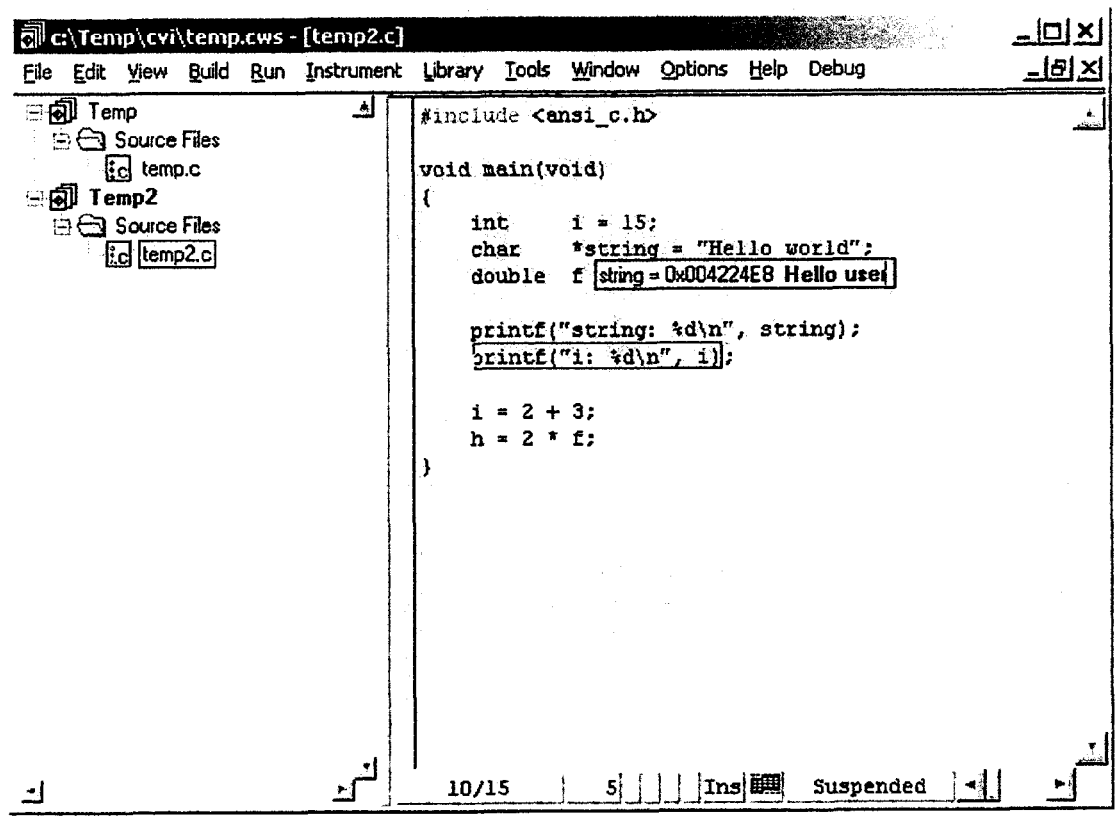
FIGS. 6A-6C illustrate various embodiments of an editable tooltip.
Figure 6B:
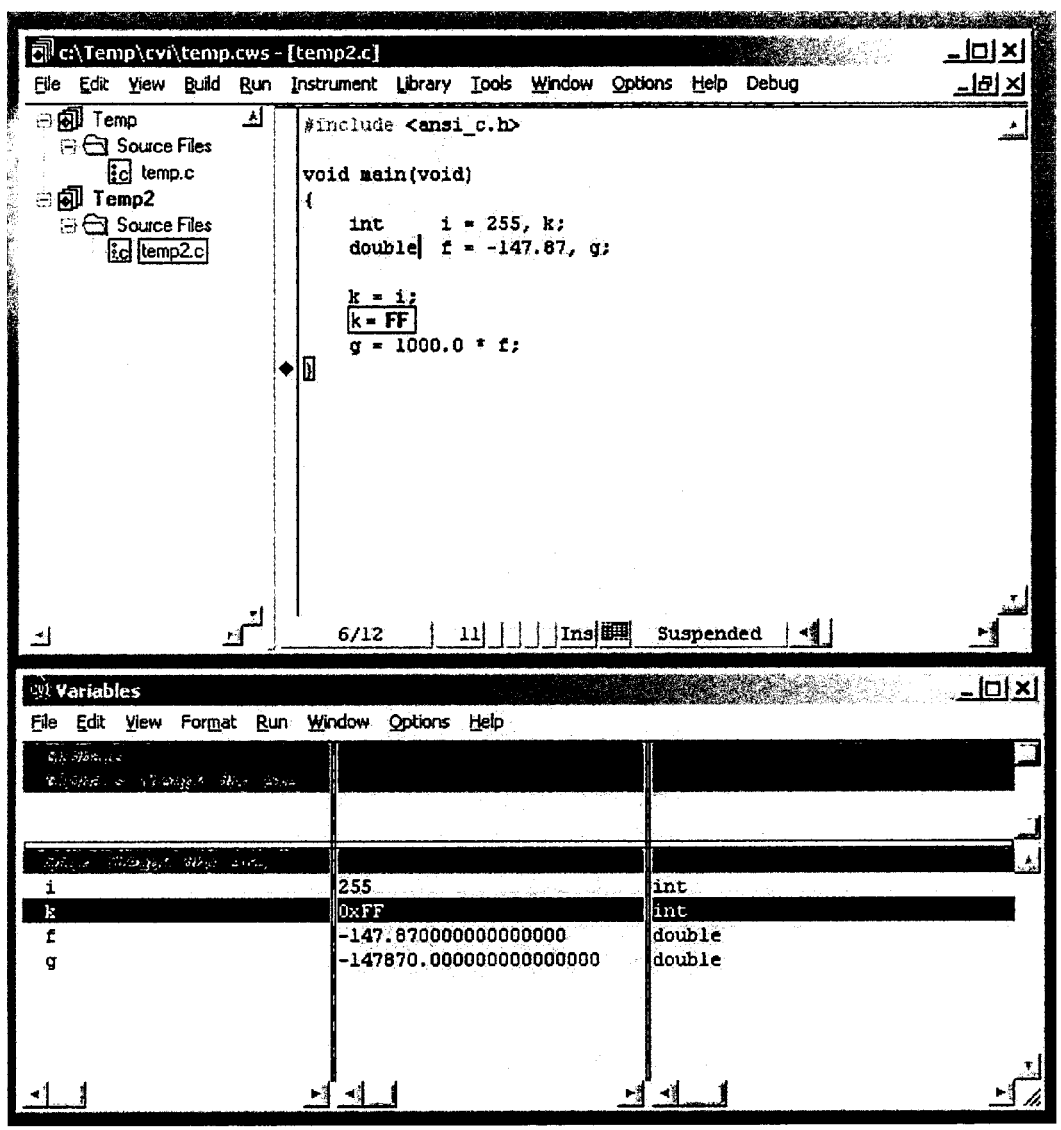
Figure 6C:
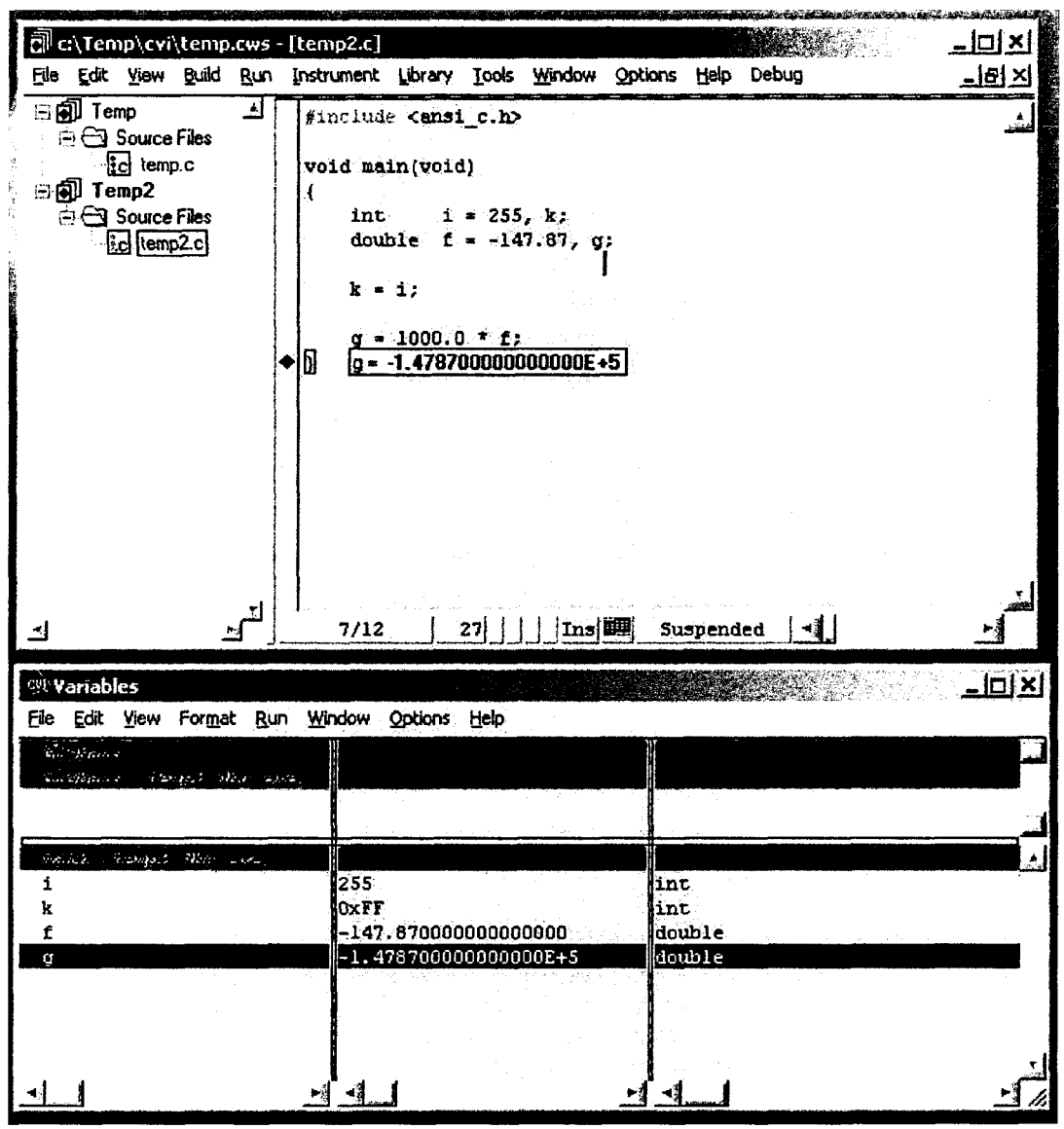

FIGS. 6A-6C illustrate examples of an editable tooltip, according to one embodiment. FIG. 6A illustrates a tooltip invoked for displaying and editing a string. As FIG. 6A shows, in this embodiment, the non-editable information displayed by the tooltip includes the variable name "string", and memory location "0x004224E8", and the editable information, i.e., the value of the string "Hello user" is displayed in bold type, indicating to the user that the value is editable.

FIG. 6B illustrates a tooltip invoked for displaying and editing an integer. As shown, the tooltip of FIG. 6B displays the variable name "k", as well as the value in hexadecimal format "FF", where the value is displayed in bold type to indicate its editability.

FIG. 6C illustrates a tooltip invoked for displaying and editing a floating point or real value, where the tooltip displays the variable name "g" and the value "−1.4787000 . . . E+5", in scientific notation (also in bold type).

Note that although FIGS. 6A-6C also include a variable window displaying variables and their values, the variable window is not necessary for invocation or use of the tooltip. In these examples, the variable window is provided to confirm that the variables and values displayed in the tooltips are accurate. As mentioned below, the variable window may also be used to indicate formats for the displayed values.

Thus, in one embodiment, the tooltip may facilitate viewing and editing numeric data in various formats like decimal, hexadecimal, octal, binary, and ASCII for integer data and floating point or scientific notation format for single and double precision data. As noted above, one embodiment, the user may choose the format based on the user's preference and/or the context of the data. In one embodiment, the user may be able to choose different formats for different variables in the same program, i.e., the format preferences may be set globally and then overwritten for individual variables and expressions. In one embodiment, the method may use data formatting preferences set in the variable/watch windows when displaying numeric data to be edited in the tooltips, as illustrated in the examples of FIGS. 6A-6C.

Thus, in one embodiment, to make the data tooltip editable, a string or numeric control may be included in the tooltip, and the controls made interactive when the user starts editing the displayed value, where the string control is used when the data being edited is a string, and the numeric control is used when the data being edited is a number (floating point or integer data). A text indicator is preferably included to display the non-editable portion of the tooltip (variable name, address, expression terms, etc.). Note that before the user starts editing the data, the new controls preferably cannot be distinguished from the rest of the tooltip contents, as indicated in FIGS. 6A-6C. In other words, the string and numeric controls may be customized to be substantially transparent to the user.

Thus, various embodiments of the systems and methods presented herein may facilitate user invocation and use of editable tooltips during debugging of a program, whereby the user may view and edit values for specified or indicated expressions in the program source code.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer accessible memory medium which stores program instructions implementing a graphical user interface (GUI) for debugging a program, wherein, during execution of the program, the program instructions are executable by a processor to perform:
   loading a debug environment;
   loading a program, wherein the program is an executable program compiled from source code;
   loading the source code for the program; and
   performing, via the debug environment, at runtime:
     displaying the source code for the program on a display during execution of the program;
     receiving first user input hovering a mouse cursor over an expression in the source code during execution of the program;
     in response to said hovering the mouse cursor over the expression, automatically displaying a tooltip proximate to the expression, wherein the tooltip includes a value of the expression;
     receiving second user input to the tooltip modifying the displayed value, thereby specifying a new value for the expression; and
     setting the expression in the program to the new value in response to the second user input, wherein the program continues execution in accordance with the new value of the expression.

2. The non-transitory computer accessible memory medium of claim 1, wherein the tooltip is context sensitive.

3. The non-transitory computer accessible memory medium of claim 2, wherein the tooltip comprises a control corresponding to a data type of the expression, and wherein the data type of the expression comprises at least one of:
- a string data type;
- a character data type;
- a numeric data type;
- a Boolean data type; and
- an array data type.

4. The non-transitory computer accessible memory medium of claim 2, wherein the tooltip is operable to display the value of the expression in a specified format;
wherein if the expression comprises integer data, the specified format comprises one or more of:
- decimal;
- hexadecimal;
- octal;
- binary; and
- ASCII; and wherein if the expression comprises single or double precision, the specified format comprises one or more of:
- floating point; and
- scientific notation.

5. The non-transitory computer accessible memory medium of claim 4, wherein the specified format is specified via a second tooltip in the GUI.

6. The non-transitory computer accessible memory medium of claim 1, wherein the tooltip comprises:
- a first portion, operable to display the value of the expression, wherein the first portion is further operable to receive the second user input modifying the value; and
- a second portion, operable to display non-editable information related to the expression.

7. The non-transitory computer accessible memory medium of claim 6, wherein the second portion comprises a text indicator, operable to display text.

8. The non-transitory computer accessible memory medium of claim 6, wherein the first portion is further operable to graphically indicate that the value is editable.

9. The non-transitory computer accessible memory medium of claim 1, wherein the expression comprises a variable.

10. The non-transitory computer accessible memory medium of claim 1, wherein the expression comprises a syntactic expression comprising one or more of:
- one or more variables;
- one or more constants;
- one or more macros; and
- one or more operators.

11. The non-transitory computer accessible memory medium of claim 1, wherein the execution of the program is in debugging mode.

12. The non-transitory computer accessible memory medium of claim 1, wherein the program instructions are further executable to perform:
- evaluating the expression to determine the value of the expression.

13. The non-transitory computer accessible memory medium of claim 1, wherein the program instructions are further executable to perform:
- dismissing the tooltip based on one or more of:
  - third user input, indicating dismissal of the tooltip; and
  - lapse of a specified time period.

14. A method for debugging a program, the method comprising:
- loading a debug environment;
- loading a program, wherein the program is an executable program compiled from source code;
- loading the source code for the program; and
- performing, via the debug environment, at runtime:
  - displaying source code for the program on a display during execution of the program, wherein the executing program was compiled from the source code;
  - receiving first user input hovering a mouse cursor over an expression in the source code during execution of the program;
  - in response to said hovering the mouse cursor over the expression, automatically displaying a value of the expression in a tooltip proximate to the expression;
  - receiving second user input to the tooltip modifying the displayed value, thereby specifying a new value for the expression; and
  - setting the expression in the program to the new value, wherein the program continues execution in accordance with the new value of the expression.

15. A system for debugging a program, the system comprising:
- a processor; and
- a memory coupled to the processor, wherein the memory medium comprises program instructions implementing a graphical user interface (GUI) for debugging the program, wherein the program instructions are executable by the processor to:
  - load a debug environment;
  - load a program, wherein the program is an executable program compiled from source code;
  - load the source code for the program; and
  - perform, via the debug environment, at runtime:
    - display source code for the program on a display during execution of the program, wherein the executing program was compiled from the source code;
    - receive first user input hovering a mouse cursor over an expression in the source code during execution of the program;
    - in response to said hovering the mouse cursor over the expression, automatically display a value of the expression in a tooltip proximate to the expression;
    - receive second user input to the tooltip modifying the displayed value, thereby specifying a new value for the expression; and
    - set the expression in the program to the new value, wherein the program continues execution in accordance with the new value of the expression.

16. A system for debugging a program, the system comprising:
- means for loading a debug environment;
- means for loading a program, wherein the program is an executable program compiled from source code;
- means for loading the source code for the program; and
- wherein the debug environment comprises:
  - means for, at runtime, displaying source code for the program on a display during execution of the program, wherein the executing program was compiled from the source code;
  - means for, at runtime, receiving first user input hovering a mouse cursor over an expression in the source code during execution of the program;

means for, at runtime, automatically displaying a value of the expression in a tooltip proximate to the expression in response to said hovering the mouse cursor over the expression;

means for, at runtime, receiving second user input to the tooltip modifying the displayed value, thereby specifying a new value for the expression; and means for, at runtime, setting the expression in the program to the new value, wherein the program continues execution in accordance with the new value of the expression.

* * * * *